(12) United States Patent
Yoo et al.

(10) Patent No.: US 11,600,080 B2
(45) Date of Patent: Mar. 7, 2023

(54) LANE MARKER DETECTION

(71) Applicant: QUALCOMM Incorporated, San Diego, CA (US)

(72) Inventors: Seungwoo Yoo, Yongin-si (KR); Heesoo Myeong, Seoul (KR); Hee-Seok Lee, Seongnam-si (KR)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/200,592

(22) Filed: Mar. 12, 2021

(65) Prior Publication Data

US 2021/0287018 A1   Sep. 16, 2021

Related U.S. Application Data

(60) Provisional application No. 62/988,795, filed on Mar. 12, 2020.

(51) Int. Cl.
*G06T 7/10* (2017.01)
*G06V 20/56* (2022.01)
*G06T 7/73* (2017.01)

(52) U.S. Cl.
CPC .............. *G06V 20/588* (2022.01); *G06T 7/10* (2017.01); *G06T 7/75* (2017.01); *G06T 2207/30256* (2013.01)

(58) Field of Classification Search
CPC ........... G06V 20/588; G06T 7/10; G06T 7/75; G06T 2207/30256
See application file for complete search history.

(56) References Cited

U.S. PATENT DOCUMENTS

| 2009/0034877 | A1* | 2/2009 | Kefeder ............... G06T 3/4023 |
| | | | 382/298 |
| 2014/0153823 | A1* | 6/2014 | Lee ....................... G06T 3/4015 |
| | | | 382/167 |
| 2019/0266418 | A1 | 8/2019 | Xu et al. |
| 2020/0285869 | A1* | 9/2020 | Mansour ............. G06V 20/588 |

OTHER PUBLICATIONS

Van Gansbeke Wouter et al.: "End-to-end Land Detection through Differentiable Least Squares Fitting", 2019 IEEE/CVF International Conference on Computer Vision Workshop (ICCVW), IEEE, Oct. 27, 2019 (Oct. 27, 2019), pp. 905-913 (Year: 2019).*
International Search Report and Written Opinion—PCT/US2021/022245—ISA/EPO—dated Jun. 28, 2021.

(Continued)

*Primary Examiner* — Myron Wyche
(74) *Attorney, Agent, or Firm* — Patterson + Sheridan, LLP (57) ABSTRACT

Certain aspects of the present disclosure provide a method for lane marker detection, including: receiving an input image; providing the input image to a lane marker detection model; processing the input image with a shared lane marker portion of the lane marker detection model; processing output of the shared lane marker portion of the lane marker detection model with a plurality of lane marker-specific representation layers of the lane marker detection model to generate a plurality of lane marker representations; and outputting a plurality of lane markers based on the plurality of lane marker representations.

28 Claims, 6 Drawing Sheets

(56) References Cited

OTHER PUBLICATIONS

Ronneberger O., et al., "U-Net: Convolutional Networks for Biomedical Image Segmentation", May 18, 2015, ICIAP: International Conference on Image Analysis and Processing, 17th International Conference, Naples, Italy, Sep. 9-13, 2013 Proceedings, [Lecture Notes in Computer Science, Lect.Notes Computer], Springer, Berlin, Heidelberg, pp. 234-241, XP047331005, ISBN: 978-3-642-17318-9 [retrieved on Nov. 18, 2015] p. 237-p. 238, figure 1.
Wouter V.G., et al., "End-to-End Lane Detection through Differentiable Least-Squares Fitting", 2019 I EEE/CVF International Conference on Computer Vision Workshop (ICCVW), IEEE, Oct. 27, 2019 (Oct. 27, 2019), pp. 905-913, XP033732320, DOI: 10.1109/ICCVW.2019.00119 [retrieved on Mar. 2, 2020] figures 1, 5, 7 p. 906, col. 2, paragraph 2 p. 912, col. 2, paragraph 2 Section 3.3, p. 910, paragraph 2 p. 911, col. 1, paragraph 1.

* cited by examiner

LANE MARKER DETECTION

CROSS-REFERENCE TO RELATED APPLICATIONS

This application claims the benefit of and priority to U.S. Provisional Patent Application No. 62/988,795, filed Mar. 12, 2020, the entire contents of which are incorporated herein by reference.

INTRODUCTION

Aspects of the present disclosure relate to systems and methods for fast and robust lane detection.

Modern vehicles are increasingly equipped with advanced driver assistance systems, which among other things, may include lane detection for assisted and autonomous driving functions. Existing techniques for lane detection are slow, require significant manual configuration, and lack robustness across many driving scenarios. Thus, existing systems for lane detection are not suitable for modern vehicles.

Accordingly, what are needed are systems and methods that provide fast and robust lane detection.

BRIEF SUMMARY

Certain aspects provide a method for lane marker detection, including: receiving an input image; providing the input image to a lane marker detection model; processing the input image with a shared lane marker portion of the lane marker detection model; processing output of the shared lane marker portion of the lane marker detection model with a plurality of lane marker-specific representation layers of the lane marker detection model to generate a plurality of lane marker representations; and outputting a plurality of lane markers based on the plurality of lane marker representations.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

The systems and methods disclosed herein enable fast and robust lane detection in various applications. For example, the systems and methods disclosed herein may enable accurate and robust localization of lane markers in real-time in vehicles having assisted and autonomous driving functions.

Generally, a lane marker is a device or material on a road surface that conveys information, such as where lanes exist on a roadway. Examples of lane markers include painted traffic lines, painted cross-walks, painted parking spaces, handicap parking spaces, reflective markers, curbs, gutters, Botts' dots, and rumble strips, to name a few.

Lane markers may be used in autonomous vehicle navigation. For example, a vehicle may include an advanced driver assistance system (ADAS) or a high-level self-driving system (SDS). Such systems are being widely adopted based in large part on concurrent improvements in computer vision technologies.

Although there are a number of components related to ADAS and SDS systems, such as lane marker detection, vehicle detection tracking, obstacle detection, scene understanding, and semantic segmentation, lane detection is a key component for camera perception and positioning. For example, lane detection is necessary for keeping a vehicle within the ego-lane (the lane in which the vehicle is positioned, which may also be referred to as a host lane), and for assisting the vehicle in changing lanes to the left or the right of the ego-lane.

Most conventional lane marker detection methods are based on two-stage semantic segmentation approaches. In the first stage of such approaches, a network is designed to perform a pixel-level classification that assigns each pixel in an image to a binary label: lane or not lane. However, in each pixel classification, the dependencies or structures between pixels are not considered, and thus an additional post processing is performed in the second stage to explicitly impose constraints, such as uniqueness or straightness of a detected line. The post processing can be applied using, for example, a conditional random field, additional networks, or sophisticated computer vision techniques like random sample consensus (RANSAC), but these post processing techniques require high computational complexity and generally require careful and manual integration into lane marker detection systems. As such, two-stage semantic segmentation approaches are difficult to deploy in various applications.

Another problem with current lane marker detection methods is power consumption. Processing each image in a stream of images may require a great deal of computing power, which is not always available or practical in automotive contexts. In particular, for electric vehicles, power consumption of on-board systems is a significant consideration.

By contrast, aspects described herein relate to an efficient end-to-end architecture that directly predicts lane marker vertices without any costly post-processing steps. More particularly, in aspects described herein, the lane marker detection problem is considered a row-wise classification task where the structural shape of lane markers, spreading from left to right in an image, is modeled in two subsets of layers in a single model. The first subset of model layers is configured to compress and model the horizontal components for the shared representation of all lanes, and the second subset of model layers is configured to model each lane based on the shared representation in order to directly output the lane marker vertices. In some aspects, the target lane marker positions are efficiently obtained by an argmax function at runtime.

Thus, aspects described herein beneficially improve upon conventional approaches for lane detection without complex post-processing, which reduces the compute power, compute time, and power usages when in-use. As such, aspects described herein may beneficially be deployed in more applications and contexts.

Example Lane Markers on a Roadway

Figure 1:
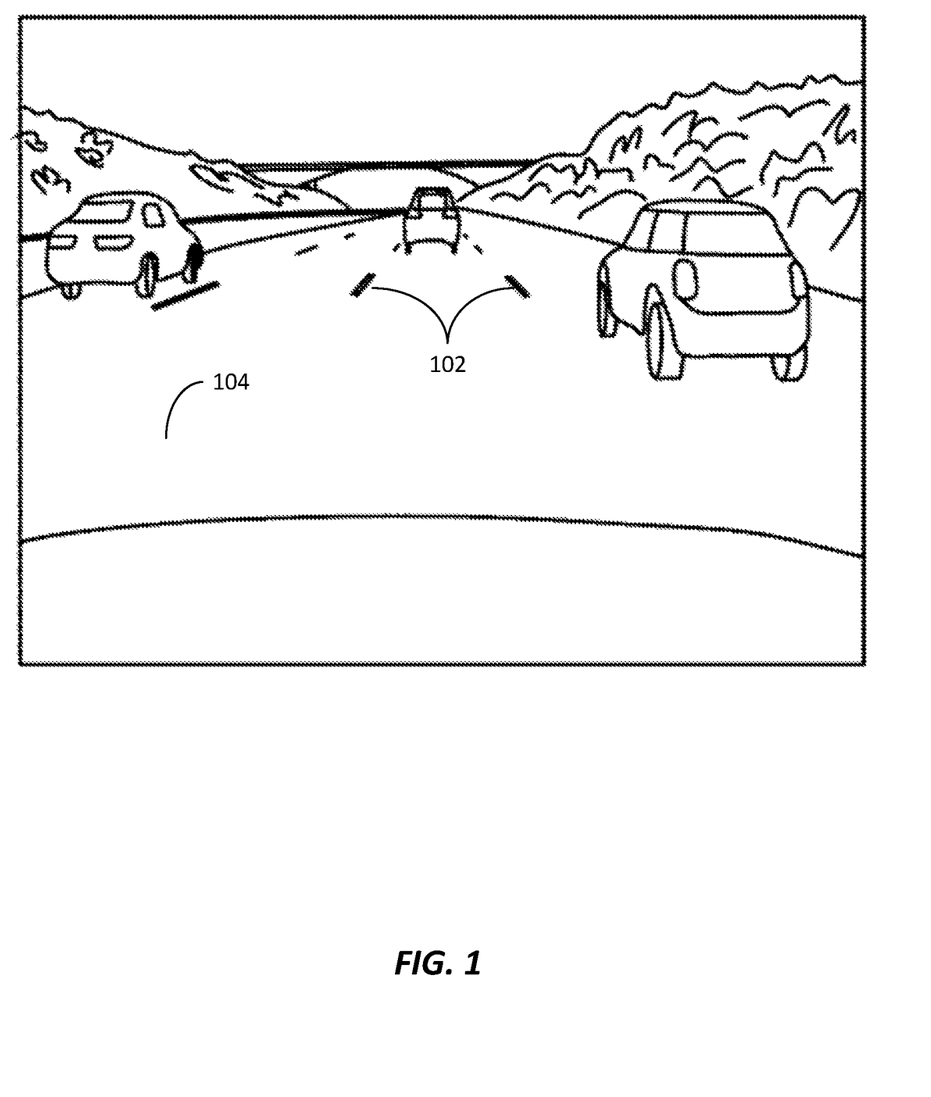
FIG. 1 depicts an example of lane markers on a roadway.

FIG. 1 depicts an example of lane markers 102 on a roadway 104. In this example, lane markers 102 are painted stripes on roadway 104, but in other examples the lane markers may be any sort of recognizable division of lanes. Lane markers 102 may be detected by a lane marker detection system and used for determining lanes for advanced driver assistance systems and semi-autonomous and autonomous self-driving systems in vehicles.

Example Electronic Lane Marker Detection System

Figure 2:
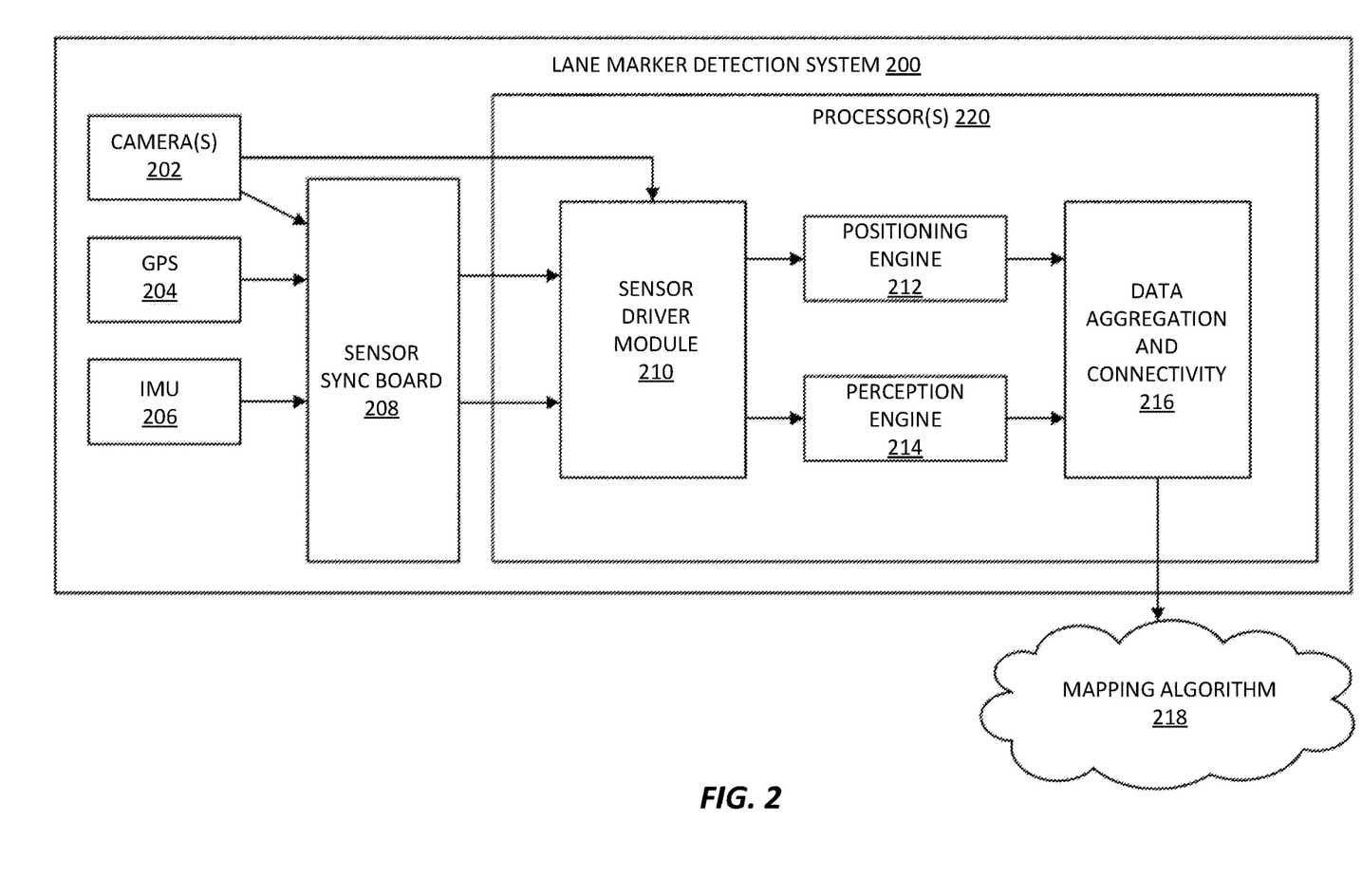
FIG. 2 depicts aspects of an example advanced driver assistance system or self-driving system.

FIG. 2 depicts aspects of an example advanced driver assistance system or self-driving system 200. System 200 may be configured to work with local sensors as well as edge processing capabilities, such as provided by mapping algorithm(s) 218.

In this aspect, system 200 includes one or more cameras 202, a global positioning system (GPS) 204, an inertial measurement unit (IMU) 206, a sensor synchronization board 208, and one or more processors 220. In this example, processor(s) 220 includes a sensor driver module 210, a positioning engine 212, a perception engine 214, and a data aggregation and connectivity module 216. Processor(s) 220 may generally communicate with one or more devices over a wireless or wired network.

In some aspects, front-end sensors, such as camera(s) 202, GPS receiver 204, and IMU 206 may be consumer-grade sensors. The sensor synchronization board 208 may include an embedded microcontroller that controls time stamps of all sensors. In some aspects, the sensor synchronization board 208 may generate time stamps with less than 10 microseconds timing error.

The output of the camera(s) 202, GPS 204, and IMU 206 may be fed into both the positioning engine 212 and the perception engine 214. The perception engine 214 is configured to detect key landmarks (e.g., lane markers) in the incoming video stream and localize them accurately in the image frames. The positioning engine 212 is configured to provide accurate estimates of camera poses in, for example, six degrees of freedom by relating the GPS signal, inertial sensor readings, and camera video inputs.

The outputs of positioning engine 212 and perception engine 214 may be aggregated and sent to an edge processing service, such as a cloud processing system, via the data aggregation and connectivity module 216. In some aspects, mapping algorithm 218 may generate a location estimate of the landmarks in the global frame, where the global frame includes an entire map or a large part of a map.

Lane Marker Detection Model Architecture

Unlike conventional segmentation based lane detection techniques, aspects described herein directly recognize lane marker positions in image input data. More specifically, given input image $X \in R^{h \times w \times c}$, where h is the height of an image data (e.g., in pixels), w is the width of the image data (e.g., in pixels), and c is the number of channels in the image, the objective is to find a lane marker $l_i$ (i=1, ..., $N_{lane}$) set of vertices $\{vl_{ij}\} = \{(x_{ij}, y_{ij})\}$ (j=1, ..., K), where $N_{lane}$ is the number of lanes in an image, which is generally pre-defined, and K is the total number of vertices.

The methods described herein reduce the complexity of the aforementioned objective by finding the set of horizontal locations of a lane marker in an image. Specifically, row-wise representations for lane marker are determined by dividing the image into rows and solving a lane marker detection task as a row-wise position classification problem, or regression problem depending on selected loss function, using a convolutional neural network. Note that with a row-wise representation, the possible total number of vertices K is limited to image height h. In some aspects, the network may perform a row-wise regression in order to identify locations of lanes, as described in more detail below.

The lane marker detection model (e.g., a convolutional neural network model) discussed herein outputs three predictions: (1) horizontal location of lane vertex $x_{ij}$; (2) vertex-wise existence confidence $vc_{ij}$; and (3) lane marker-wise existence confidence $l_{ci}$. From these model outputs, each lane marker $l_i$ can be obtained by the following expression:

$$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases} \quad \text{(Eq. 1)}$$

where $vl_{ij}$ is a set of vertices $\{(x_{ij}, y_{ij})\}$ associated with the lane marker and $T_{vc}$ and $T_{lc}$ are thresholds of vertex-wise existence confidence and lane-wise existence confidence, respectively.

Figure 3:
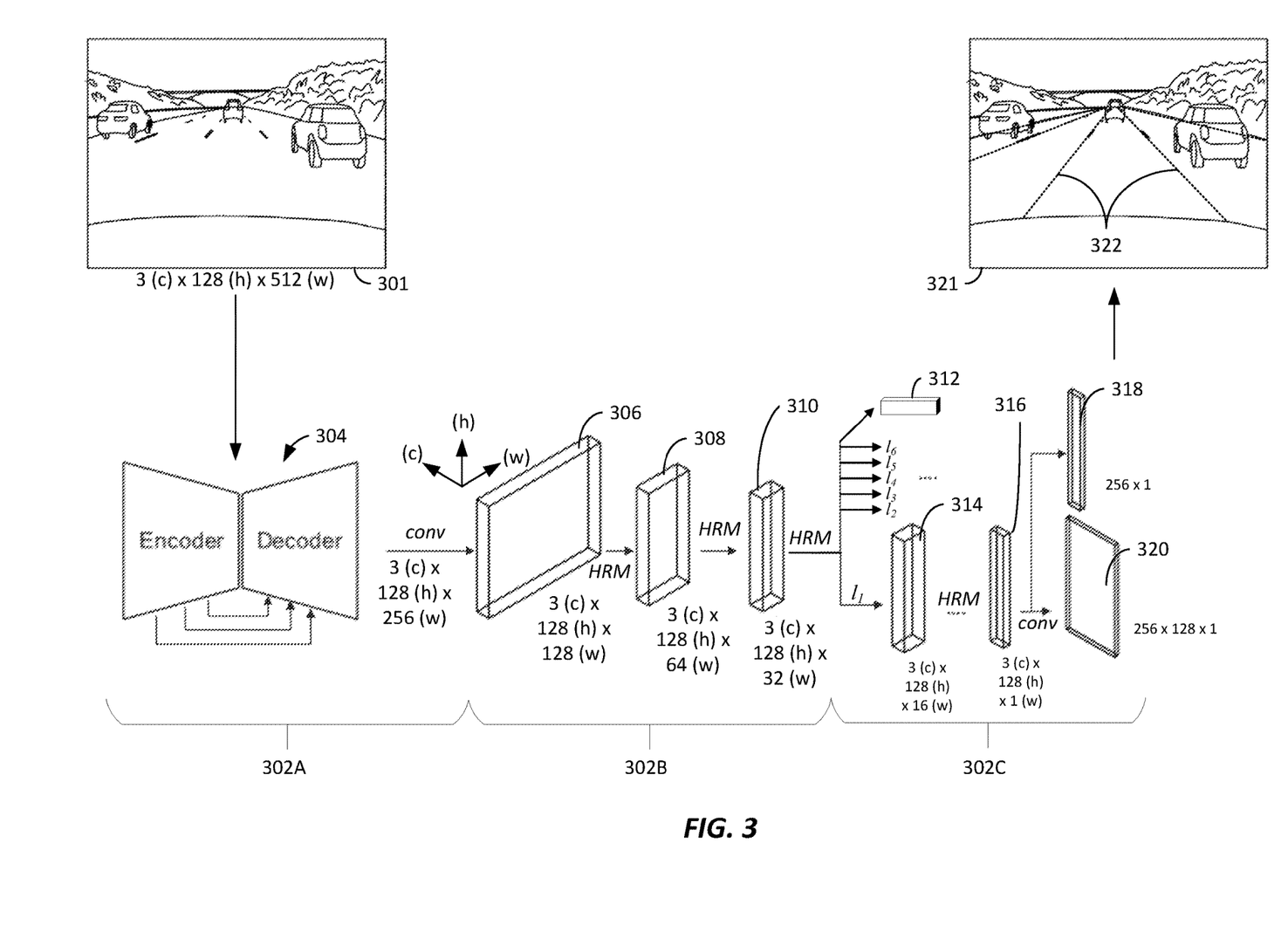
FIG. 3 depicts aspects of an example lane marker detection model architecture.

FIG. 3 depicts aspects of an example lane marker detection model architecture, such as may be implemented by perception engine 214 in FIG. 2. The lane marker detection model may be configured as a deep neural network trained to predict the location of lane markers in input image data (e.g., image 301), which can then be used to predict lane representations (e.g., 322 in output image 321).

In the following discussion, lane representations may generally refer to boundaries of a driving lane on a roadway. For example, a current or ego-lane in which a vehicle is driving may include two representation boundaries bounding the lane on the left and right side. Similarly, the lane to the left of the current lane may include its own two representation boundaries, which in some cases may include a shared boundary representation. For example, the left boundary representation of a current lane may represent the right boundary representation of a lane to the left of the current lane.

In this example, model architecture 300 consists of three intra-model stages 302A-C. The first stage 302A includes an encoder-decoder styled segmentation network 304 configured to encode information of lane markers in an image. Unlike conventional image segmentation, in this example the encoder-decoder styled segmentation network 304 is configured to recover half the spatial resolution of input image 301 to beneficially reduce computational complexity.

In other words, in this example, input image 301 includes an input resolution of 128 height×512 width×3 channels (e.g., red, green, blue) and the output of the encoder-decoder styled segmentation network 304 is 128 height×256 width×3 channels. Notably, these resolutions, and the other resolutions depicted in FIG. 3 are merely examples, and others are possible. Further, other aspects may omit the encoder-decoder network in favor of other image data compression techniques, including other sorts of neural network blocks.

The second stage 302B includes layers shared by all of the potential lane marker representations and may be referred to as the shared reduction layers, which in this example includes three layers 306, 308, and 310. In the second stage 302B, the horizontal (h) dimension of the shared lane marker representation are progressively compressed (or "squeezed") in each successive layer using a horizontal reduction module (HRM), without changing the vertical dimension. An example HRM is described with respect to FIG. 4. This form of compression operation leads to row-wise representations in a natural way because the HRM successively squeezes the spatial width components so that, for example, only one lane vertex exists in each column (width) at the final features of each lane.

The third stage 302C includes lane-specific reduction layers, which in this example includes layers 314, 316, 318, and 320. In third stage 302C, the lane-specific reduction layers further compress the lane marker representations using lane-specific HRMs to generate a single vector lane marker representation, such as 316.

Notably, the shared representation in stage 302B and the lane-specific representations in stage 302C allow for tuning the performance of the overall model. For computational efficiency, a first subset of reduction layers are shared across lanes in stage 302B, followed by a second subset of lane-wise reduction layers in stage 302C. Using dedicated reduction layers for each lane marker representation in stage 302C improves performance of the overall model, since each lane marker representation has different innate spatial and shape characteristics. With more shared layers, additional computational cost may be saved, but accuracy of each lane might be degraded. As such, the performance can be tuned for the application.

Stage 302C includes two branches for each lane-specific representation $l_i$ (of which six are represented as an example in FIG. 3): a row-wise vertex location branch 320 and a vertex-wise confidence branch 318, which are configured to perform classification and confidence regression on the final compressed layers 316. In this aspect, the final (and fully) compressed layers 316 have spatial resolution only in the vertical dimension and a number of channels according to a target horizontal resolution h' (e.g., h'=h/2). The classification branch 320 predicts the horizontal position $x_{ij}$ of lane marker $l_i$, which can set predicted vertices as $(x_{ij}, y_{ij})$, $y_{ij} \in h'$. The confidence 318 branch predicts the vertex confidence $vc_{ij}$, which relates to whether each vertex $vl_{ij}$ of a lane marker exists or not.

Finally, a lane marker existence confidence layer 312 produces a confidence $l_{ci}$ after shared HRM. The lane marker existence relates to whether a semantic lane marker (e.g., current lane left-marker, current lane right-marker, one lane left left-marker, one lane left right-marker, one lane right left-marker, one lane right right-marker, etc.) is detected in the image data.

Figure 4:
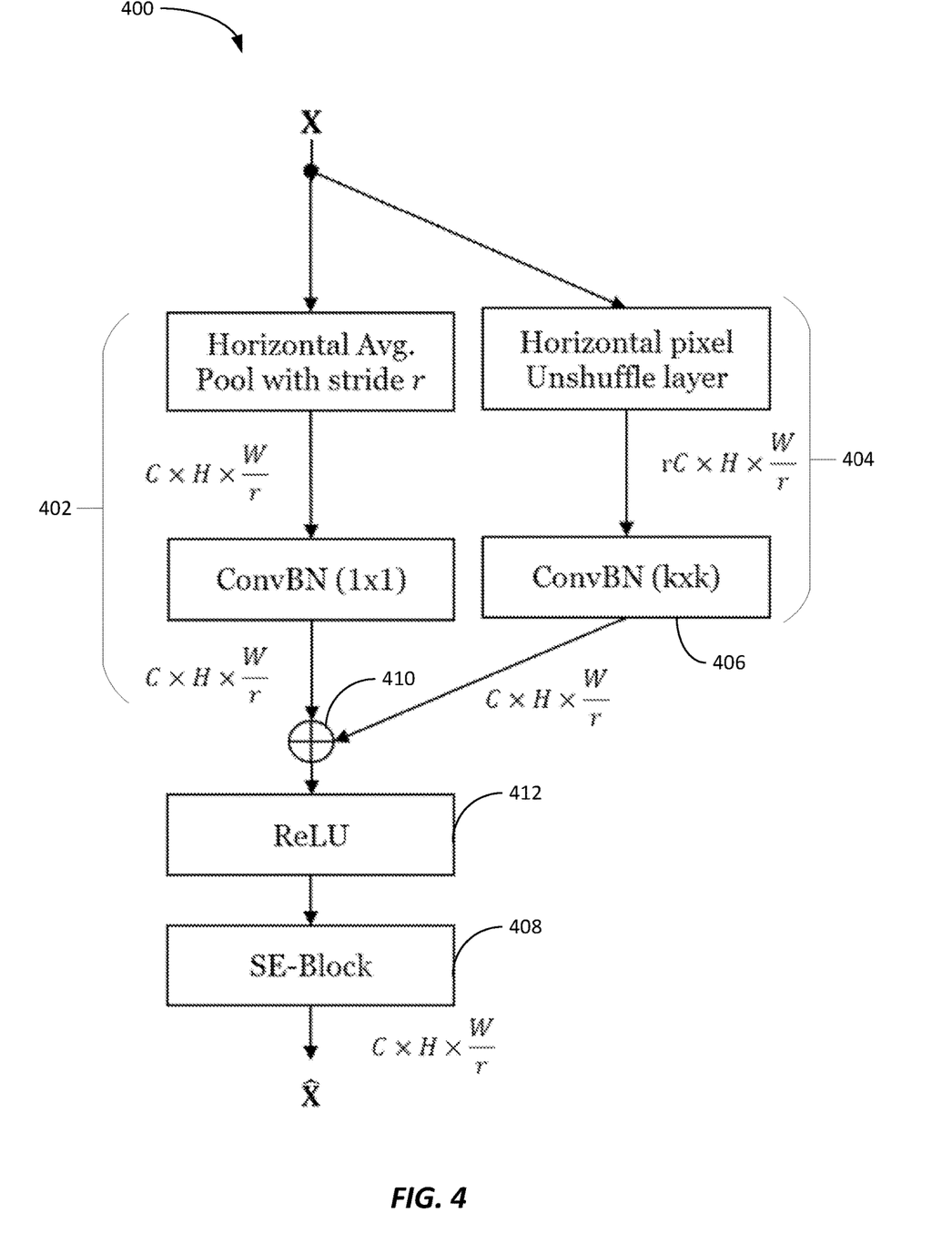
FIG. 4 depicts an example horizontal reduction module, which may be used for compressing (or "squeezing") layers in a lane marker detection model.

FIG. 4 depicts an example horizontal reduction module 400, which may be used for compressing (or "squeezing") layers as discussed in FIG. 3.

To effectively compress horizontal lane marker representations, residual layers are utilized in horizontal reduction model 400. Specifically, a horizontal average pooling layer with 1×1 convolution is added to a skip connection 402 to down-sample horizontal components. Although pool operations let the deeper layers gather more spatial context (to improve classification) and reduce computational computation, they still have the drawback of reducing the pixel precision. Therefore, to effectively keep and enhance horizontal representation of the elements of the C×H×W, input tensor (X) is rearranged to a tensor of shape rC×H×W/r in a residual branch 404. This operation may be referred to as a horizontal pixel unshuffle layer. By rearranging the representation of the input tensor, spatial information can be efficiently moved to channel dimensions.

After rearranging the input tensor, a convolution operation at block 406 may be applied to reduce the increased channel dimensionality rC back to the original channel dimensionality C, which not only reduces the computational burden, but also helps to effectively compress lane marker spatial information from the pixel unshuffle layer.

The output of residual branch 404 is then combined with the skip connection 402 at 410, where the combined results are then provided to an activation function, such as ReLU (412) in this example.

To further improve the discrimination between lane markers, an attention mechanism may be added by way of a Squeeze and Excitation (SE) block 408. An SE block helps to include global information in the decision process by aggregating the information in the entire receptive field, and recalibrates channel-wise feature responses that have spatial information encoded by the pixel unshuffle layer.

Thus, horizontal reduction module 400 beneficially compresses the spatial lane marker information to generate compressed horizontal representation output, $\hat{X}$.

Example Training Method for Lane Marker Detection Model

In one example, the training objective is to optimize total loss L given by:

$$L = L_{vl} + \lambda_1 L_{vc} + \lambda_2 L_{lc},$$

where $L_{vl}$, $L_{vc}$, and $L_{lc}$ are losses for lane marker vertex location, lane marker vertex confidence, and lane marker-wise confidence, respectively, and $\lambda_1$ and $\lambda_2$ are weights for the last two losses, which allows fine tuning of the training.

Regarding lane marker vertex location loss ($L_{vl}$), because the lane marker detection is formulated as a row-wise classification on a lane marker's horizontal position, any loss function for classification can be used to train the lane marker vertex branch, including cross-entropy, Kullback-Leibler (KL)-divergence, and piecewise-linear probability (PL)-loss, to name a few examples.

The cross-entropy loss $L_{ij}^{CE}$ for lane marker $l_i$ at vertical position $y_{ij}$ can be computed using the ground truth location $x_{ij}^g$ and the predicted log its $f_{ij}$ having W=2 channels.

To train the lane marker vertex location branch using KL-divergence loss $L_{ij}^{KL}$, a sharply-peaked target distribution of lane marker position can be made as a Laplace distribution $Laplace_{gt}(\mu, b)$ with $\mu = x_{ij}^g$ and $b=1$, and then compared to an estimated distribution $Laplace_{pred}(\mu, b)$ with:

$$\mu = E_{f_{ij}}[x_{ji}] = \text{softargmax}(x_{ji}) = \Sigma_{W/2} \text{softmax}(f_{ij}) \cdot x_{ij} \text{ and}$$
$$b = E_{f_{ij}}[|x_{ji} - E_{f_{ij}}[x_{ji}]|].$$

In case of PL-loss, the lane marker position probability may be modeled as a piecewise-linear probability distribution. For an input image, the total lane marker vertex location loss is given by $$L_{vl} = \frac{1}{N_{Lane}} \sum_{i}^{N_{Lane}} \frac{1}{\sum_{j} e_{ij}} \sum_{j}^{K} L_{ij}^{type} \times e_{ij},$$

where $e_{ij}$ denotes whether ground truth exists or not by setting 1 if there is lane marker $l_i$ has a vertex at $y_{ij}$ and 0 if not.

For lane marker vertex confidence loss, the lane marker vertex existence is a binary classification problem, thus trained using binary cross-entropy loss $L_{ij}^{BCE}$ between a single scalar-value prediction at each $y_{ij}$ location of lane marker $l_i$ and ground truth existence $e_{ij}$. The loss for an entire image is then computed as:

$$L_{ve} = \frac{1}{N_{Lane} \times K} \sum_{i}^{N_{Lane}} \sum_{j}^{K} L_{ij}^{BCE}.$$

For lane marker label loss, binary cross-entropy loss $L_i^{BCE}$ may be added to train the lane marker level existence prediction. The loss is computed using the predicted $N_{lane}$-dimensional vector and existence of each lane $l_i$ in the ground truth. The total loss is then computed as $$L_{le} = \frac{1}{N_{Lane}} \sum_{i}^{N_{Lane}} L_i^{BCE}.$$

Inference with a Lane Marker Detection Model

At inference time, an estimated vertex position may be predicted based on the loss function selected (e.g., as from those described above). Specifically, if cross-entropy or PL-loss loss is used, then the lane marker vertex may be selected by using an argmax function. If KL-divergence loss is used instead, the estimated vertices may be extracted by using softargmax. To consider the existence of each lane marker vertex, the sigmoid outputs of the vertex and lane-wise existence branches can be used to reject low confidence positions according to Equation 1, above.

Example Method for Detecting Lane Markers

Figure 5:
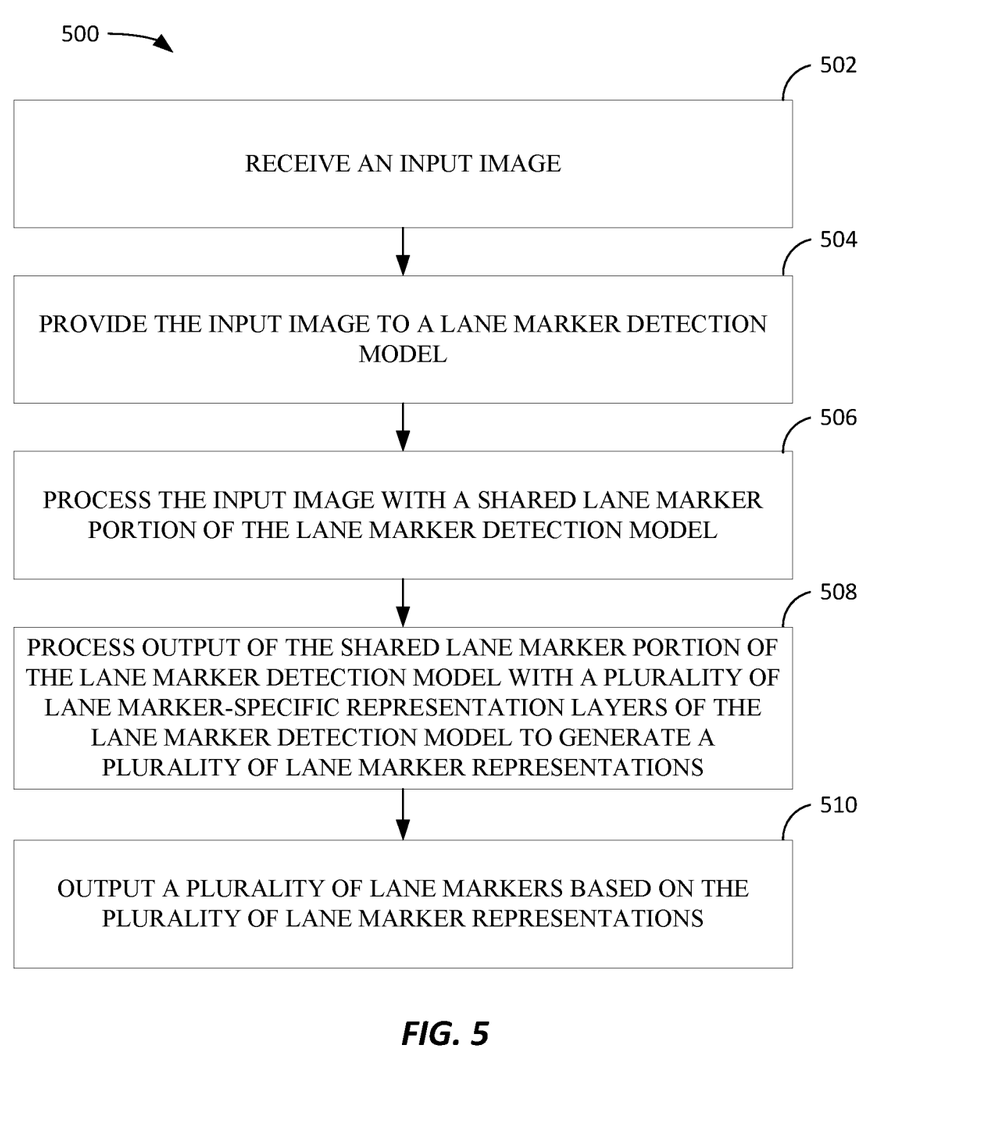
FIG. 5 depicts an example method for detecting lane markers.

FIG. 5 depicts an example method 500 for detecting lane markers.

Method 500 begins at step 502 with receiving an input image. In some examples, the input image comprises h vertical pixels, w horizontal pixels, and c channels, for example, such as described with respect to FIG. 3. The input image may generally be a still image, an image or frame of a stream of images in a video stream, or the like.

Method 500 then proceeds to step 504 with providing the input image to a lane marker detection model, such as the model described above with respect to FIG. 3.

Method 500 then proceeds to step 506 with processing the input image with a shared lane marker portion of the lane marker detection model, such as described above with respect to 302B in FIG. 3. In some cases, processing the input image with the shared lane marker portion of the lane marker detection model comprises processing the input image through a plurality of shared lane marker representation layers of the lane marker detection model.

Method 500 then proceeds to step 508 with processing output of the shared lane marker portion of the lane marker detection model with a plurality of lane marker-specific representation layers of the lane marker detection model to generate a plurality of lane marker representations, such as described above with respect to 302C in FIG. 3. In some aspects, each lane marker-specific representation layer is associated with one lane marker representation of a plurality of lane marker representations, and each lane marker representation may be associated with a subset of the plurality of lane marker-specific representation layers.

Method 500 then proceeds to step 510 with outputting a plurality of lane markers based on the plurality of lane marker representations.

In some aspects of method 500, outputting the plurality of lane markers (e.g., $l_i$) comprises, for each lane marker of the plurality of lane markers: predicting a horizontal location of a lane vertex (e.g., $x_{ij}$) using a first output layer of the lane marker detection model; predicting a vertex-wise existence confidence (e.g., $vc_{ij}$) using a second output layer of the lane marker detection model; and predicting a lane marker-wise existence confidence (e.g., $l_{ci}$) using a third output layer of the lane marker detection model.

In some aspects of method 500, outputting the plurality of lane markers further comprises: predicting each lane marker $l_i$ using the following expression:

$$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases},$$

where $vl_{ij}$ is a set of vertices $\{(x_{ij}, y_{ij})\}$ associated with each lane marker $l_i$.

In some aspects, method 500 further comprises compressing the input image using an encoder-decoder segmentation network.

In some aspects of method 500, the last lane marker-specific representation layers for each respective lane marker-specific representation comprises a size of h vertical pixels, 1 horizontal pixel, and c channels.

In some aspects, method 500 further comprises using one or more horizontal reduction modules to compress input data in the shared lane marker portion of the lane marker detection model, such as described above with respect to FIGS. 3 and 4.

In some aspects, method 500 further comprises using one or more additional horizontal reduction modules to compress input data in the plurality of lane marker-specific representation layers of the lane marker detection model, such as described above with respect to FIGS. 3 and 4.

In some aspects, method 500 further comprises displaying on an output image a plurality of lane representations, such as depicted in FIG. 3 (e.g., 322).

Note that method 500 is one example method, and others are possible. In particular, other examples may include fewer, additional, and/or alternative steps as compared to method 500 consistent with the various aspects described herein.

Example Processing System

Figure 6:
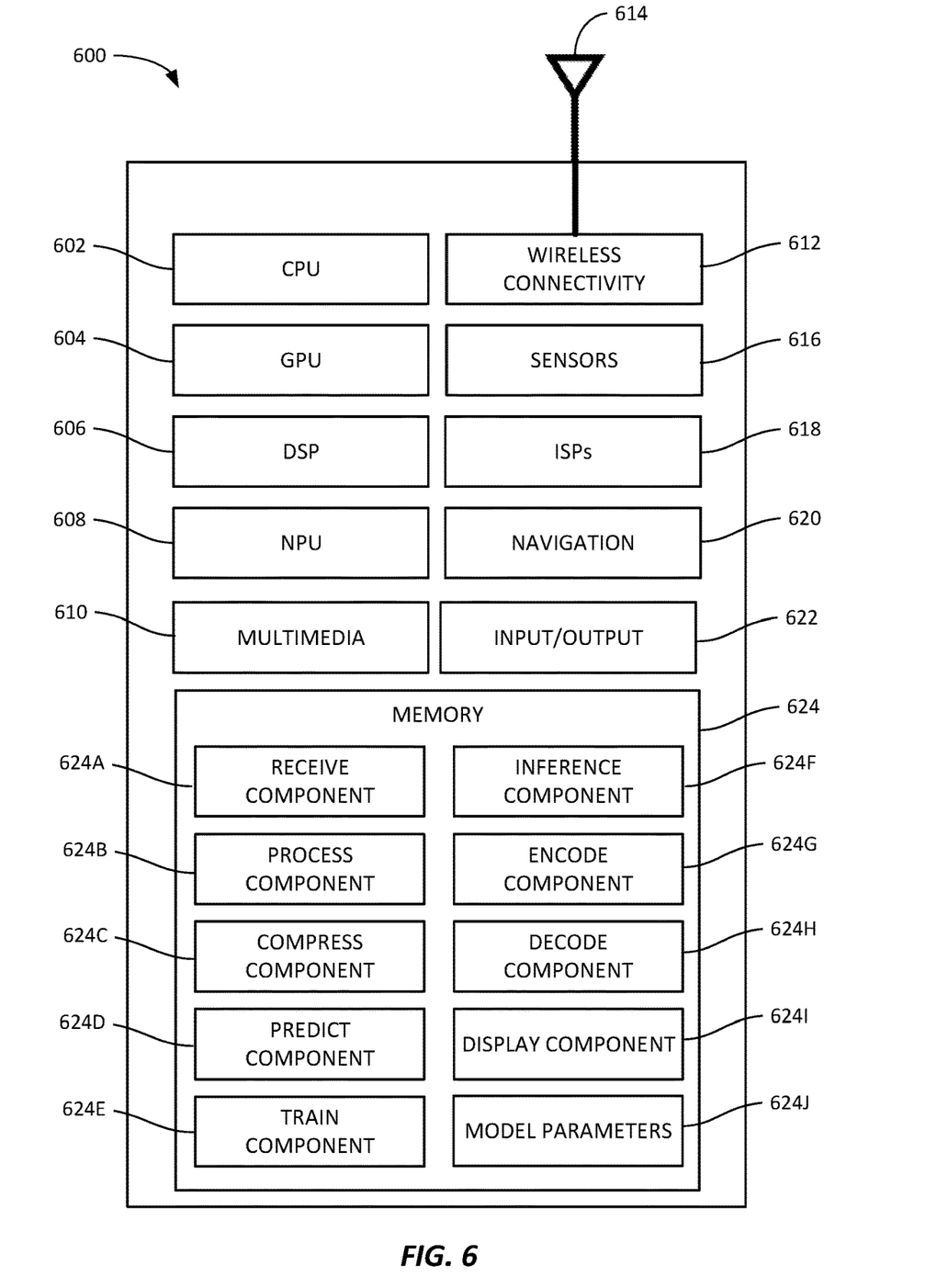
FIG. 6 depicts an example processing system that may be configured to detect lane markers as described herein.

FIG. 6 depicts an example processing system 600 that may be configured to detect lane markers as described herein, for example, with respect to method 500 of FIG. 5.

Processing system 600 includes a central processing unit (CPU) 602, which in some examples may be a multi-core CPU. Instructions executed at the CPU 602 may be loaded, for example, from a program memory associated with the CPU 602 or may be loaded from a memory partition 624.

Processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612. In some examples, one or more of CPU 602, GPU 604, DSP 606, and NPU 608 may act as processors 202 of FIG. 2.

An NPU, such as 608, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error. In some embodiments, NPU 608 may be configured to train various aspects of model architecture 300 of FIG. 3.

NPUs designed to accelerate inference are generally configured to operate on complete models. Such NPUs may thus be configured to input a new piece of data and rapidly process it through an already trained model to generate a model output (e.g., an inference). In some embodiments, NPU 608 may be configured to process various aspects of model architecture 300 of FIG. 3.

In one implementation, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 612 is further connected to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components. In some examples, sensors 616 may include cameras 202 and IMU 206 of FIG. 2. In some examples, navigation processor 620 may include GPS 204 of FIG. 2.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In this example, memory 624 includes receive component 624A (e.g., for receiving input data to be processed by a lane marker detection model), process component 624B (e.g., for processing various aspects of the lane marker detection models described herein), compress component 624C (e.g., for compressing data, such as by a horizontal reduction module), predict (or output) component 624D (e.g., such as the various outputs of the lane marker detection models described herein), train component 624E (e.g., for training lane marker detection models), inference component 624F, encode component 624G (e.g., for encoding input data), decode component 624H (e.g., for decoding encoded data), display component 624I (e.g., for displaying lane markers and other information), and model parameters 624J (e.g., comprising parameters for a lane marker detection model, such as described herein). The depicted components, and others not depicted, may be configured to perform various aspects of the methods described herein.

For example, receive component 624A may be configured for receiving input data, such as input image data.

Notably, in other embodiments, aspects of processing system 600 may be omitted, such as where processing system 600 is a server computer or the like. For example, multimedia component 610, wireless connectivity 612, sensors 616, ISPs 618, and/or navigation component 620 may be omitted in other embodiments. Further, aspects of processing system 600 maybe distributed.

Note that FIG. 6 is just one example, and in other examples, alternative processing system with fewer, additional, and/or alternative components may be used.

Example Clauses

Implementation examples are described in the following numbered clauses:

Clause 1: A method, comprising: receiving an input image; providing the input image to a lane marker detection model; processing the input image with a shared lane marker portion of the lane marker detection model; processing output of the shared lane marker portion of the lane marker detection model with a plurality of lane marker-specific representation layers of the lane marker detection model to generate a plurality of lane marker representations; and outputting a plurality of lane markers based on the plurality of lane marker representations.

Clause 2: The method of Clause 1, wherein processing the input image with the shared lane marker portion of the lane marker detection model comprises processing the input image through a plurality of shared lane marker representation layers of the lane marker detection model.

Clause 3: The method of any one of Clauses 1-2, wherein outputting the plurality of lane markers comprises, for each lane marker of the plurality of lane markers: predicting a horizontal location of a lane vertex using a first output layer of the lane marker detection model; predicting a vertex-wise existence confidence using a second output layer of the lane marker detection model; and predicting a lane marker-wise existence confidence using a third output layer of the lane marker detection model.

Clause 4: The method of Clause 3, wherein predicting the plurality of lane markers $l_i$ further comprises: predicting each lane marker $l_i$ according to $$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases},$$

wherein $vl_{ij}$ is a set of vertices $\{(x_{ij}, y_{ij})\}$ associated with each lane marker $l_i$, $T_{vc}$ is a vertex-wise existence confidence, and $T_{lc}$ is a lane-wise existence confidence threshold.

Clause 5: The method of any one of Clauses 1-4, further comprising compressing the input image using an encoder-decoder segmentation network.

Clause 6: The method of any one of Clauses 1-5, wherein a last lane marker-specific representation layer for each respective lane marker-specific representation comprises a size of h vertical pixels, 1 horizontal pixel, and c channels.

Clause 7: The method of any one of Clauses 1-6, further comprising using one or more horizontal reduction modules to compress input data in the shared lane marker portion of the lane marker detection model.

Clause 8: The method of Clause 7, further comprising using one or more additional horizontal reduction modules to compress input data in the plurality of lane marker-specific representation layers of the lane marker detection model.

Clause 9: The method of any one of Clauses 1-7, further comprising displaying on an output image a plurality of lane representations.

Clause 10: A method of training a lane marker detection model, comprising minimizing a total loss L given by $L+L_{vl}+\lambda_1 L_{vc}+\lambda_2 L_{lc}$, wherein $L_{vl}$ is a lane marker vertex location loss component, $L_{vc}$ is a lane marker vertex confidence loss component, $L_{lc}$ is a lane marker-wise confidence loss component, $\lambda_1$ is a first loss tuning parameter, and $\lambda_2$ is a second loss tuning parameter.

Clause 11: A processing system, comprising: a memory comprising computer-executable instructions; one or more processors configured to execute the computer-executable instructions and cause the processing system to perform a method in accordance with any one of Clauses 10.

Clause 12: A processing system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving an input image;
   providing the input image to a lane marker detection model;
   processing the input image with a shared lane marker portion of the lane marker detection model;
   processing output of the shared lane marker portion of the lane marker detection model with a plurality of lane marker-specific representation layers of the lane marker detection model to generate a plurality of lane marker representations; and
   outputting a plurality of lane markers based on the plurality of lane marker representations.

2. The method of claim 1, wherein processing the input image with the shared lane marker portion of the lane marker detection model comprises processing the input image through a plurality of shared lane marker representation layers of the lane marker detection model.

3. The method of claim 1, wherein outputting the plurality of lane markers comprises, for each lane marker of the plurality of lane markers:
   predicting a horizontal location of a lane vertex using a first output layer of the lane marker detection model;
   predicting a vertex-wise existence confidence using a second output layer of the lane marker detection model; and
   predicting a lane marker-wise existence confidence using a third output layer of the lane marker detection model.

4. The method of claim 3, wherein outputting the plurality of lane markers further comprises predicting each lane marker $l_i$ according to:

$$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases},$$

wherein $vl_{ij}$ is a set of vertices $\{(x_{ij}, y_{ij})\}$ associated with each lane marker $l_i$, $T_{vc}$ is a vertex-wise existence confidence, and $T_{lc}$ is a lane-wise existence confidence threshold.

5. The method of claim 1, further comprising compressing the input image using an encoder-decoder segmentation network.

6. The method of claim 1, wherein a last lane marker-specific representation layer for each respective lane marker-specific representation comprises a size of h vertical pixels, 1 horizontal pixel, and c channels.

7. The method of claim 1, further comprising using one or more horizontal reduction modules to compress input data in the shared lane marker portion of the lane marker detection model.

8. The method of claim 7, further comprising using one or more additional horizontal reduction modules to compress input data in the plurality of lane marker-specific representation layers of the lane marker detection model.

9. The method of claim 1, further comprising displaying on an output image a plurality of lane representations.

10. A processing system, comprising:
    a memory comprising computer-executable instructions; and
    one or more processors configured to execute the computer-executable instructions and cause the processing system to:
      receive an input image;
      provide the input image to a lane marker detection model;
      process the input image with a shared lane marker portion of the lane marker detection model;
      process output of the shared lane marker portion of the lane marker detection model with a plurality of lane marker-specific representation layers of the lane marker detection model to generate a plurality of lane marker representations; and
      output a plurality of lane markers based on the plurality of lane marker representations.

11. The processing system of claim 10, wherein in order to process the input image with the shared lane marker portion of the lane marker detection model, the one or more processors are further configured to cause the processing system to process the input image through a plurality of shared lane marker representation layers of the lane marker detection model.

12. The processing system of claim 10, wherein in order to output the plurality of lane markers, the one or more processors are further configured to cause the processing system to, for each lane marker of the plurality of lane markers:
    predict a horizontal location of a lane vertex using a first output layer of the lane marker detection model;
    predict a vertex-wise existence confidence using a second output layer of the lane marker detection model; and
    predict a lane marker-wise existence confidence using a third output layer of the lane marker detection model.

13. The processing system of claim 12, wherein outputting the plurality of lane markers further comprises predicting each lane marker $l_i$ according to:

$$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases},$$

wherein $vl_{ij}$ is a set of vertices $\{(x_{ij}, y_{ij})\}$ associated with each lane marker $l_i$, $T_{vc}$ is a vertex-wise existence confidence, and $T_{lc}$ is a lane-wise existence confidence threshold.

14. The processing system of claim 10, wherein the one or more processors are further configured to cause the processing system to compress the input image using an encoder-decoder segmentation network.

15. The processing system of claim 10, wherein a last lane marker-specific representation layer for each respective lane marker-specific representation comprises a size of h vertical pixels, 1 horizontal pixel, and c channels.

16. The processing system of claim 10, wherein the one or more processors are further configured to cause the processing system to use one or more horizontal reduction modules to compress input data in the shared lane marker portion of the lane marker detection model.

17. The processing system of claim 16, wherein the one or more processors are further configured to cause the processing system to use one or more additional horizontal reduction modules to compress input data in the plurality of lane marker-specific representation layers of the lane marker detection model.

18. The processing system of claim 10, wherein the one or more processors are further configured to cause the processing system to display on an output image a plurality of lane representations.

19. A non-transitory computer-readable medium comprising instructions that, when executed by one or more processors of a processing system, cause the processing system to perform a method, the method comprising:
  receiving an input image;
  providing the input image to a lane marker detection model;
  processing the input image with a shared lane marker portion of the lane marker detection model;
  processing output of the shared lane marker portion of the lane marker detection model with a plurality of lane marker-specific representation layers of the lane marker detection model to generate a plurality of lane marker representations; and
  outputting a plurality of lane markers based on the plurality of lane marker representations.

20. The non-transitory computer-readable medium of claim 19, wherein
  processing the input image with the shared lane marker portion of the lane marker detection model comprises processing the input image through a plurality of shared lane marker representation layers of the lane marker detection model.

21. The non-transitory computer-readable medium of claim 19, wherein outputting the plurality of lane markers comprises, for each lane marker of the plurality of lane markers:
  predicting a horizontal location of a lane vertex using a first output layer of the lane marker detection model;
  predicting a vertex-wise existence confidence using a second output layer of the lane marker detection model; and
  predicting a lane marker-wise existence confidence using a third output layer of the lane marker detection model.

22. The non-transitory computer-readable medium of claim 21, wherein outputting the plurality of lane markers further comprises predicting each lane marker $l_i$ according to:

$$\{vl_{ij}\} = \begin{cases} \{(x_{ij}, y_{ij}) \mid vc_{ij} > T_{vc}\} & \text{if } l_{ci} > T_{lc} \\ \text{else } 0 \end{cases},$$

wherein $vl_{ij}$ is a set of vertices $\{(x_{ij}, y_{ij})\}$ associated with each lane marker $l_i$, $T_{vc}$ is a vertex-wise existence confidence, and $T_{lc}$ is a lane-wise existence confidence threshold.

23. The non-transitory computer-readable medium of claim 19, wherein the method further comprises compressing the input image using an encoder-decoder segmentation network.

24. The non-transitory computer-readable medium of claim 19, wherein a last lane marker-specific representation layer for each respective lane marker-specific representation comprises a size of h vertical pixels, 1 horizontal pixel, and c channels.

25. The non-transitory computer-readable medium of claim 19, wherein the method further comprises using one or more horizontal reduction modules to compress input data in the shared lane marker portion of the lane marker detection model.

26. The non-transitory computer-readable medium of claim 25, wherein the method further comprises using one or more additional horizontal reduction modules to compress input data in the plurality of lane marker-specific representation layers of the lane marker detection model.

27. The non-transitory computer-readable medium of claim 19, wherein the method further comprises displaying on an output image a plurality of lane representations.

28. A processing system, comprising:
  means for receiving an input image;
  means for providing the input image to a lane marker detection model;
  means for processing the input image with a shared lane marker portion of the lane marker detection model;
  means for processing output of the shared lane marker portion of the lane marker detection model with a plurality of lane marker-specific representation layers of the lane marker detection model to generate a plurality of lane marker representations; and
  means for outputting a plurality of lane markers based on the plurality of lane marker representations.

* * * * *